Sept. 29, 1936. J. POLAK 2,055,944
DEVICE FOR PRODUCING DIE CASTINGS FROM METAL ALLOYS, IN WHICH
THE MATERIAL TO BE PRESSED IS FORCED FROM A PRESSURE CHAMBER
UNDER A HIGH PRESSURE INTO A PERMANENT MOLD
Filed Jan. 10, 1934 6 Sheets-Sheet 1

Inventor:

Sept. 29, 1936.  J. POLAK  2,055,944
DEVICE FOR PRODUCING DIE CASTINGS FROM METAL ALLOYS, IN WHICH
THE MATERIAL TO BE PRESSED IS FORCED FROM A PRESSURE CHAMBER
UNDER A HIGH PRESSURE INTO A PERMANENT MOLD
Filed Jan. 10, 1934  6 Sheets-Sheet 2

Inventor:

Sept. 29, 1936.  J. POLAK  2,055,944
DEVICE FOR PRODUCING DIE CASTINGS FROM METAL ALLOYS, IN WHICH
THE MATERIAL TO BE PRESSED IS FORCED FROM A PRESSURE CHAMBER
UNDER A HIGH PRESSURE INTO A PERMANENT MOLD
Filed Jan. 10, 1934  6 Sheets—Sheet 4

Inventor.

Sept. 29, 1936.　　　　J. POLAK　　　2,055,944
DEVICE FOR PRODUCING DIE CASTINGS FROM METAL ALLOYS, IN WHICH
THE MATERIAL TO BE PRESSED IS FORCED FROM A PRESSURE CHAMBER
UNDER A HIGH PRESSURE INTO A PERMANENT MOLD
Filed Jan. 10, 1934　　　6 Sheets-Sheet 5

Inventor:

Patented Sept. 29, 1936

2,055,944

UNITED STATES PATENT OFFICE 2,055,944

DEVICE FOR PRODUCING DIE CASTINGS FROM METAL ALLOYS, IN WHICH THE MATERIAL TO BE PRESSED IS FORCED FROM A PRESSURE CHAMBER UNDER A HIGH PRESSURE INTO A PERMANENT MOLD

Josef Polak, Prague, Czechoslovakia, assignor, by mesne assignments, to firm Transforma Aktiengesellschaft, Vaduz, Liechtenstein, Austria Application January 10, 1934, Serial No. 706,086
In France January 18, 1933

5 Claims. (Cl. 22—92)

This invention relates to a device for producing die castings, in which the material to be cast is forced from a pressure chamber under high pressure into a permanent mold. Numerous methods and devices are known in which molten metal is forced out from a pressure chamber under high pressure into an iron mold. In by far the majority of devices of this type the pressure chamber is arranged relative to the mold in such a manner, that the metal during the pressing operation does not pass directly into the mold in the direction of movement imparted to it by the pressing means, for example the pressing piston, but is considerably deflected once or several times on its passage from the pressure chamber to the mold. Thus, very considerable losses of flow occur so that, during the filling of the mold the greater part of the pressure applied in the pressure chamber is required to overcome the resistance to flow and only a small portion exerts a useful effect.

Devices for casting under pressure operating with piston pressure have already been constructed, in which the mold to be filled is arranged in the rectilineal extension of the pressure chamber. Some of these have a horizontal or inclined pressure chamber and others an upright or vertical pressure chamber; in some of the latter the pressure chamber is situated below the mold and in others it is above the same. All these known constructions, however, possess disadvantages which do not enable full utilization of the advantages of the movement of the metal in rectilineal direction, which consist primarily in obtaining a casting which is as far as possible free from blisters, and moreover introduce objections in operation which detrimentally affect the speed of work.

In the piston pumps with horizontally arranged pressing piston hitherto employed it is impossible to completely fill the pressure chamber with metal before the injection, an air space always remains in the pressure chamber above the metal so that the pressing piston forces in front of it air and metal during its pressure stroke, so that, owing to the considerable speed and the unavoidable jolting and whirling proceedings air must be whirled into the metal being pressed, this air being present in the castings in the form of blisters. Moreover, the horizontally operating piston pumps of this type are open to the objection that the pressing piston, which forms the lateral closure of the pressure chamber, cannot be moved completely out of the pressure chamber during the normal operation. Consequently a metal burr which penetrates in the joint between the piston and its guide is not automatically removed during each operation, but can remain between the piston and the guide during a large number of operations causing the piston to seize, which may possibly cause considerable damage to the casting device. In order to remove the metal burr clamped between the piston and the guide, the piston must be run completely out of the pressure chamber in an operation separate from the normal working operation so that separate driving devices are necessary which render the construction more complicated and more expensive and represent an additional expenditure reducing the output.

In piston pumps with vertical pressure chamber arranged below the mold the mold must be entirely removed from the pressure chamber each time for removing the residue of material remaining in the pressure chamber after the pressure stroke. Thus, on the one hand a complicated construction of the machine results and on the other hand an additional source of trouble is produced owing to the great number of sliding or operating surfaces which must be pressed tightly together during the pressure stroke, the additional source of trouble (for example in the event of metal penetrating into the joint between the carriage and the support of the mold) can lead to very troublesome disturbances in service and to considerable damaging of the device.

In the known constructions of die casting devices with pressure chamber arranged above the mold a shutting off means is always provided in front of or in the inlet leading from the pressure chamber to the mold proper, in order to prevent the metal charged into the pressure chamber from flowing into the mold under gravity before the commencement of the real pressing pressure.

As shutting off device a closure made of destructible material such as asbestos is provided in some devices which has to be freshly inserted for every operation as it is destroyed during the pressing operation. In other devices the shutting off of the inlet is effected by a control element.

The first mentioned method, the shutting off by a destructible means, is open to the objection that the repeated insertion of the shutting off means wastes time and that there is always a danger of particles or scraps of the destructible material passing into the material to be pressed and remaining enclosed in the casting.

A shutting off element which, in open condition allows the metal to flow without deflection and loss of pressure, and which can consequently only be constructed as a cock or slide valve, is in practice open to such numerous possibilities of destruction and damaging owing to the thermic and chemical action of the metal to be cast, that devices of this type can only be employed with a certain amount of safety for metals with a very low melting point.

The method forming the subject matter of the invention differs from the known methods in a fundamental manner in that the known property of considerably cooled, viscous, pulpy, pasty or encrusted metal masses which can penetrate into narrow channels only under high pressure, owing to their viscosity or the film formed on their surface is utilized in a systematic manner in order to produce an arrangement which unites the advantages of the hitherto known arrangements without possessing their disadvantages.

According to the invention the device for carrying out this method is so constructed that the pressure chamber is arranged close beside or above the mold proper and connected therewith by inlets extending from the lower portion of the pressure chamber without shutting off means. By means of this device the method according to the invention is carried out in that the metal, which is to be pressed, is charged into the pressure chamber in such cooled condition that, owing to its viscosity or to the film formed on its surface it is prevented from flowing into the mouths of the inlets to the molds which it covers.

The pressure chamber is preferably in the same aggregate as the casting mold, arranged symmetrically to the parting line and is connected with the mold by shallow grooves cut into the parting line, so that, during the opening of the mold after the injection, the die casting together with the head adhering thereto and consisting of the cast metal and the solidified residue remaining in the pressure chamber is liberated and can be ejected.

In the method according to the invention it is essential that the metal to be pressed is charged into the pressure chamber just at the required temperature, although the metal in the storage chamber must be, as a rule, maintained at a higher temperature. In order to attain this, the metal crucible, from which the material to be pressed is withdrawn at every cycle and charged into the pressure chamber is in such condition of heat that the temperature of the metal in the same differs from the charging temperature only a small degree due to the unavoidable cooling during the transferring.

This working method causes, however, difficulties with many materials to be pressed, these difficulties being the greater the narrower that temperature range is within which the material to be pressed fulfills the conditions according to the method. In many cases such working method cannot be carried through at all. In such cases the difficulties may be overcome in that the material to be pressed is stored in the storage vessel to a comparatively higher temperature and intentionally submitted to a cooling to the required temperature condition when being transferred into the pressure chamber. Thus, it is possible in any case to carry through the method in a perfect manner. According to the kind of material to be pressed and according to the special condition of the piece to be cast this method can be carried out in different manners.

By preliminarily heating the ladle to a suitable heat temperature and by leaving the material to be pressed in the ladle for an according time it becomes possible to transform the contents of the ladle almost uniformly into a pasty, viscous or pulpy mass. On the other hand it can be attained that on the walls of the ladle a partly or entirely continuous metal film forms which is considerably cooled by maintaining the ladle at a comparatively low temperature by temporary cooling and by leaving the material to be pressed in this ladle for a correspondingly shorter period. This metal film surrounds the hotter, less viscous metal core. By means of this latter method especially such metals can be treated which possess no condition area in which they correspond simultaneously to the two above mentioned conditions.

The pressing pressure may be exerted on the metal in the pressure chamber either by compressed air or by a piston.

Several embodiments of the invention are illustrated by way of example in the accompanying drawings in which:—

Figure 1:
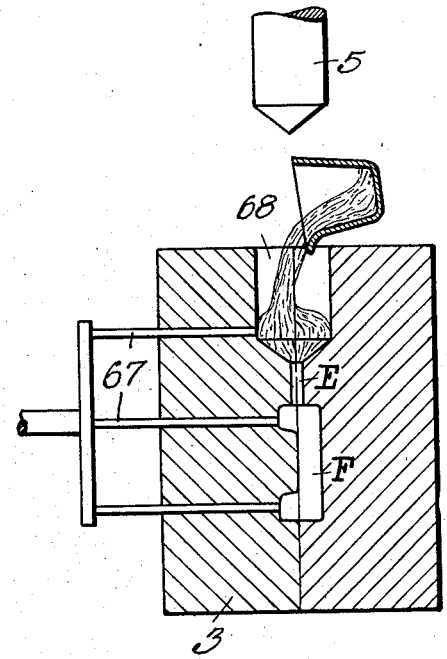
Fig. 1 shows diagrammatically in vertical section a die casting device with pressing piston during the charging of the mold.
Figure 2:
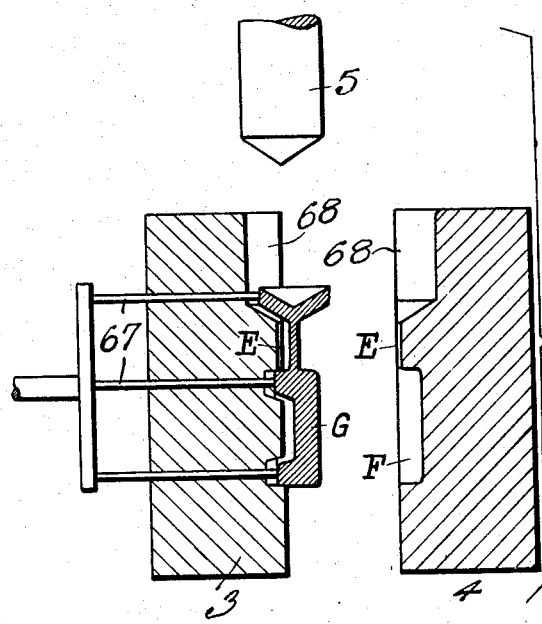
Fig. 2 is a similar view showing the device during the removal of the casting.

In the form of construction illustrated in Figs. 1 and 2 the main parts are the two blocks or mold halves 3 and each of which may consist of a single piece or is composed of several pieces. The mold cavity F for the casting to be produced, the hollow cylindrical pressure chambers 68 and the inlets E leading from the pressure chamber to the mold are worked in the blocks 3 and 4. A plunger piston 5 serves for exerting the pressing pressure and is fitted into the pressure chamber with sufficient play to prevent seizing. The two blocks 3 and 4 are placed the one on the other before the commencing of the pressing operation and pressed or locked so tightly together, that the tension of the pressed metal cannot force them apart. The plunger piston 5 is situated, prior to the injection, entirely outside the pressure chamber so that this chamber can be charged without difficulty with the material to be pressed (Fig. 1). For effecting the pressing operation the plunger piston is inserted into the pressure chamber and moved downwards therein until the mold is filled. At the termination of the pressure stroke the pressing piston is again run completely out of the pressure chamber, so that any burr forming between the cylinder wall and the piston becomes free and drops out automatically. The two blocks 3 and 4 are then separated, so that the casing G together with the cast on excess metal is exposed and can be ejected (Fig. 2). The operation of the piston and also the opening and closing movements of the aggregate comprising the blocks 3 and 4 are preferably effected hydraulically.

This example illustrates the great advantage of the method according to the invention. By arranging the pressure chamber above or close to the mold with the employment of considerably cooled, viscous or pasty or pulpy metal, it is possible to make the construction extremely simple, to avoid all appreciable detrimental accumulation of air in front of the hollow mold proper and to impart the most favorable movement to the metal to be pressed by avoiding sudden changes in direction.

Consequently, it is possible with the pressing device of the type forming the subject matter of the invention, to produce pressed castings of very complicated shape and with thin walls of perfect quality and with clean surfaces, sharp edges and particularly dense structure.

It is evident that the method above described is not restricted to the use of the arrangement of the construction illustrated in Figs. 1 and 2. Pressing devices of constructionally very different type may be employed, the main feature of which is that the pressure chamber is arranged above or at the side of the hollow mold so that the mouths of the inlets leading to the hollow mold are covered by the metal charged into the pressure chamber, but that at the same time the arrangement of shutting off elements in the admission channels leading to the mold is rendered unnecessary by employing sufficiently cooled, that is sufficiently viscous or pasty or pulpy or encrusted yet easily compressible material.

A form of construction of the device for producing die castings according to the invention will be hereinafter described. In this device a hollow space, situated on the parting line of the casting mold, preferably a vertical hollow cylinder arranged symmetrically to the parting line, serves as pressure chamber, and is connected to the mold proper by grooves worked into the parting line, the pressing pressure being exerted on the metal to be pressed by a plunger piston which, during each cycle of operations before the injection is lifted entirely out of the pressure chamber so that metal to be pressed can be charged into this chamber, introduced into the pressure cylinder for the pressing operation and pressed downwards in the same until the mold is filled.

In die casting devices of this type separate means must be provided in order to maintain the mold halves tightly closed during the injection under such high pressure that they are not forced apart by the forces occurring in the pressure chamber and in die casting mold. For this purpose particularly high closing forces are necessary in devices of this arrangement, because the very strong impulse forces occurring during a very short time in the pressure chamber at each braking of the pressure piston are transmitted to the movable mold half by the metal to be pressed. The very considerable closing forces, necessary for maintaining the mold in closed condition in spite of the pressing blows, should, however, act only during an extremely short period, in any case not longer than is absolutely necessary, because otherwise, if they act for a longer period, the construction would be excessively stressed and subjected to rapid wear particularly in the packing parts.

Consequently, a problem which has to be solved in die casting devices of this type is, to effect and control the operative movements of the die casting mold and of the pressing piston in such a manner, that the mold is held tightly closed whilst the heavy forces or blows act in the pressure chamber and in the die casting mold, but is immediately relieved when these forces decrease.

Numerous die casting devices with hydraulic mold operation have already been constructed, in which the opening and closing movements of the mold are effected by slight forces, whereas a strong force is employed for holding the mold in closed position. These arrangements are chiefly constructed so that two pressure media under different pressures are provided, of which media the low pressure medium acts in the driving cylinder for actuating the mold during the moving proceedings and the high pressure medium whilst the mold is in closed position, the changing over of the mold closing cylinder from low pressure to high pressure being effected as a rule automatically by the movable mold half arriving in position for casting, through the intermediary of a reversing gear operated either mechanically or hydraulically.

Devices of this type are, however, not suitable for the purpose in question. The employment of two pressure media under different pressures results in complication of the driving and controlling mechanisms, which can easily lead to trouble and break-downs in service, because, owing to the particularly strong closing forces necessary in the present instance, the high pressure medium must be under exceptionally high pressure to enable that the cross-section of the mold closing cylinder remains within the permissible constructional limits. Consequently, the high pressure conduits and fittings ought be able to withstand exceptionally high stresses, so that an extremely expensive construction would be necessary which, moreover, would be subject to repeated break-downs. Moreover, in arrangements of this type the high closing force acts during the whole time the mold is closed, which would be undesirable in view of the particular strength of the forces occurring.

Die casting devices have likewise been constructed, in which the action of the high closing force is made dependent upon the time the pressure acts in the pressure chamber, in that the side of the pressure piston driving cylinder controlling the pressure stroke is connected with the side of the mold actuating cylinder effecting the closing of the mold. Such arrangements are very suitable for actuating die casting machines with mold separate from the pressure chamber, in which the pressure blows occurring within the pressure chamber proper are taken up by the construction of the pressure chamber and thus do not act directly on the mold. On the other hand, they are not suitable for the operation of die casting machines of the type according to the invention, in which the pressure chamber is situated on the parting line of the mold. Owing to the ever present elasticity of the hydraulic aggregate the pressure occurring in the pressure piston driving cylinder cannot be transmitted to the mold closing cylinder absolutely at the same time but only with a slight retardation, so that the increased closing pressure acts slightly later than the pressing pressure. This is immaterial in the case of machines with mold separate from the pressure cylinder, because therein the heavy blow or impulse occurring at the commencement of the pressing operation, when the pressure piston strikes on to the metal to be pressed, is taken up by the pressure chamber construction itself, without acting in any way on the movable mold half. In machines of the type according to the invention this initial blow and also all other forces occurring in the pressure chamber act, however, directly on the movable mold half; therefore, when employing a closing mechanism of the type just described, this mold half would be subjected to the action of a heavy repulsive force at the commencement of the pressing operation before the closing pressure has attained the necessary height. The mold would therefore open at the first instant.

Consequently, none of the hitherto known arrangement for hydraulically operating the mold is capable of solving the problem in question, namely of holding by means of only one source of pressure the mold closed under the requisite, particularly heavy closing force exactly during the time determined by the pressing pressure.

This problem is solved according to the invention in that the die casting mold is controlled by a pressure fluid in such a manner that this pressure medium acts on the cylinder side actuating the closing of the mold, directly during opening and closing movement, however, during the action of the pressing pressure, through the intermediary of a pressure transmitter arranged close to, preferably directly on the mold closing cylinder, the control of the medium effecting the closing of the mold being positively connected with the control of the pressure piston drive in such a manner that, during the engagement of the pressure stroke, the pressure medium is supplied to the pressure transmitter with a slight temporal advance corresponding to the elasticity of the aggregate and the mold closing cylinder is shut off from the direct medium supply conduit, and that at the termination of the pressure stroke the pressure supply conduit to the pressure transmitter is shut off and at the same time the mold closing cylinder relieved. In a preferred form of construction of the arrangement according to the invention the pressure medium controlling the pressure piston is obtained from the same source as the driving medium for actuating the mold, so that the whole die casting device requires only a single source of pressure medium.

A condition for the perfect operation of the die casting device is, that the control elements are always actuated at the same intervals. In order to ensure this, independently of the skill of the operators, the arrangement is preferably such, that the individual operations of the hydraulic controlling elements are effected not directly by the hand or foot of the operator but automatically by hydraulic drives, which are first actuated by the operator. Thus, it is attained that the operation of the controls requires no appreciable effort and the opening and closing of all control elements is always effected at the same interval of time independently of whether the operator actuates the control lever quickly or slowly.

On the base plate 1 of the machine an upright 2 is mounted which serves for accommodating the stationary mold half 3 and the hydraulic cylinder 7, in which the stepped piston 6 actuating the pressure piston 5 reciprocates. An upright 8, also fixed in the base plate 1 carries the aggregate serving for guiding and actuating the movable mold half 4.

Figure 8:
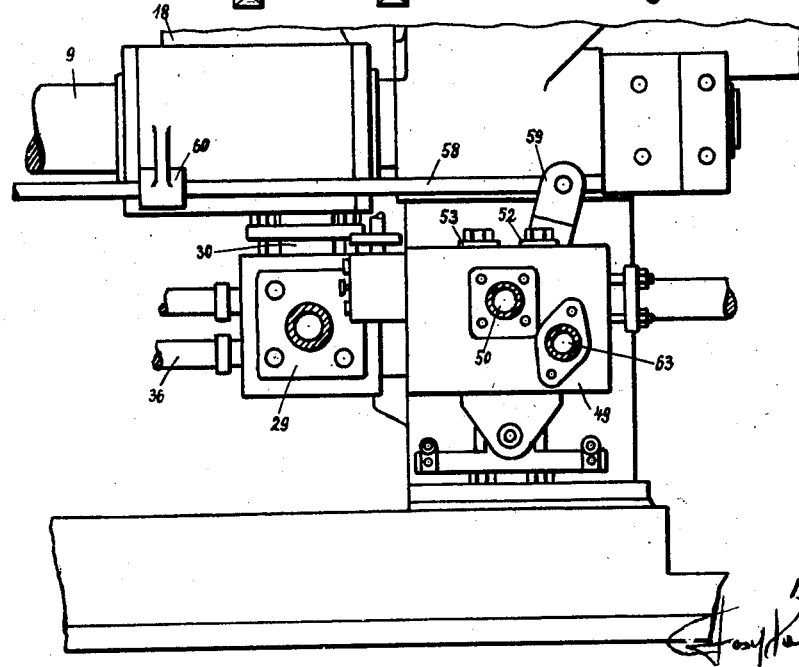
Fig. 8 shows the core drawing-control valve in elevation.

The uprights 2 and 8 are connected by three bolts 9 which are arranged in a triangle so that they do not obstruct the access to the die casting mold. The aggregate for effecting the mold closing movement comprises a hydraulic cylinder fixed on the upright 8 and in which a stepped piston 11 is fixed and a movable sleeve-shaped piston 12 so arranged that it closes the space 13 of the stationary cylinder 10 both from the outside and also from the annular space 15 between the inner wall of the cylinder 12 and the shaft of the piston 11. On the front side the cylinder 12 is closed by an end plate 18, on which the movable mold half 4 is fixed. The stepped piston 11 has two bores 16 and 17, of which the bore 16 connects the annular space 15 with a non-controlled pressure water conduit 19, the other bore 17 connecting the inner space 14 of the cylinder 12 with a controlled water conduit 43. On the end of the cylinder 10 a pressureless water tank 20 is placed, which, in position of rest, when the mold is closed, is filled with water up to the height of the discharge conduits 21 and which communicates with the internal space 13 of the cylinder 10 through a check valve 22 which shuts off the cylinder space 13 from the tank 20 as soon as a pressure occurs in this space. A pressure transmitter, enclosed by a casing 23, is mounted on the underside of the cylinder 10 opposite the tank 20, the thinner part of the stepped piston 24 of this transmitter acting directly on the inner space 13. The sleeve-shaped piston 12 is turned off at its end so that, in its extreme rearward position, it does not shut off the admission to the pressure transmitter and to the tank 20. The cylinder space 13 communicates through a valve 26 with the controlled pressure water conduit 43 or with the front space 14 of the cylinder. The valve 26 the construction of which is illustrated in Fig. 8, is controlled, by a rod system actuated from the movable mold half, in such a manner that the valve 26 remains closed during the movement of the movable mold half and is only opened when the mold is closed.

All other valves controlling the mold and the pressure piston are united to form a control block 27. Each of these valves is actuated by a hydraulic drive which in turn is actuated by a pedal arranged on a control block 44.

Figure 3:
Fig. 3 is a longitudinal section through a die casting machine, diagrammatically simplified with a diagram of the control.

The fundamental movement and effect of the control block 27 is illustrated diagrammatically in Fig. 3. A pressure water supply conduit 30 is connected to an accumulator, not shown in the drawings, by means of a main shut-off element 29. Conduits 31 lead to the discharge.

A feed valve 32 and a discharge valve 33 control the pressure piston. These valves, as shown in Fig. 3, are so arranged that the feed side of the pressure piston driving cylinder is connected with the pressure medium feed conduit 30, when the supply valve 32 is open and the discharge valve 33 is closed, and with the discharge conduit 31 when the valve 32 is closed and the valve 33 is open. The narrow annular space 37 through which the return stroke of the pressure piston is actuated is always under pressure through the non-controlled conduit 36.

Valves 38, 40, 41, and 42, mounted in the control block 27 beside the separately arranged valve 26, serve for controlling the mold closing movement. The valve 38 controls the pressure water admission to a pipe 39 leading to the pressure transmitter. The valves 40, 41 and 42, in cooperation with the valve 26, serve for controlling the pressure medium supply to and discharge from the inner spaces 13 and 14 of the mold closing cylinder aggregate, the valve 40 acting as admission valve and the valve 42 as discharge valve, so that the conduit 43 is connected with the pressure water conduit 30 when the valve 40 is open and the valve 42 closed, and with the discharge conduit 31 when the valve 40 is closed and the valve 42 closed. The check valve 41 between the valve 40 and conduit 43 shuts off the conduit 43 and therefore the inner cylinder spaces 13 and 14 from the valve 40 when pressure occurs in the pressure transmitter.

The valves 32 and 38 are, in many forms of construction, interconnected by a bore 64 of very small diameter as indicated in dot-dash lines in Fig. 3. The annular inner space 15 permanently communicates with the non-controlled pressure water conduit 19 through the conduit 16.

Figure 6:
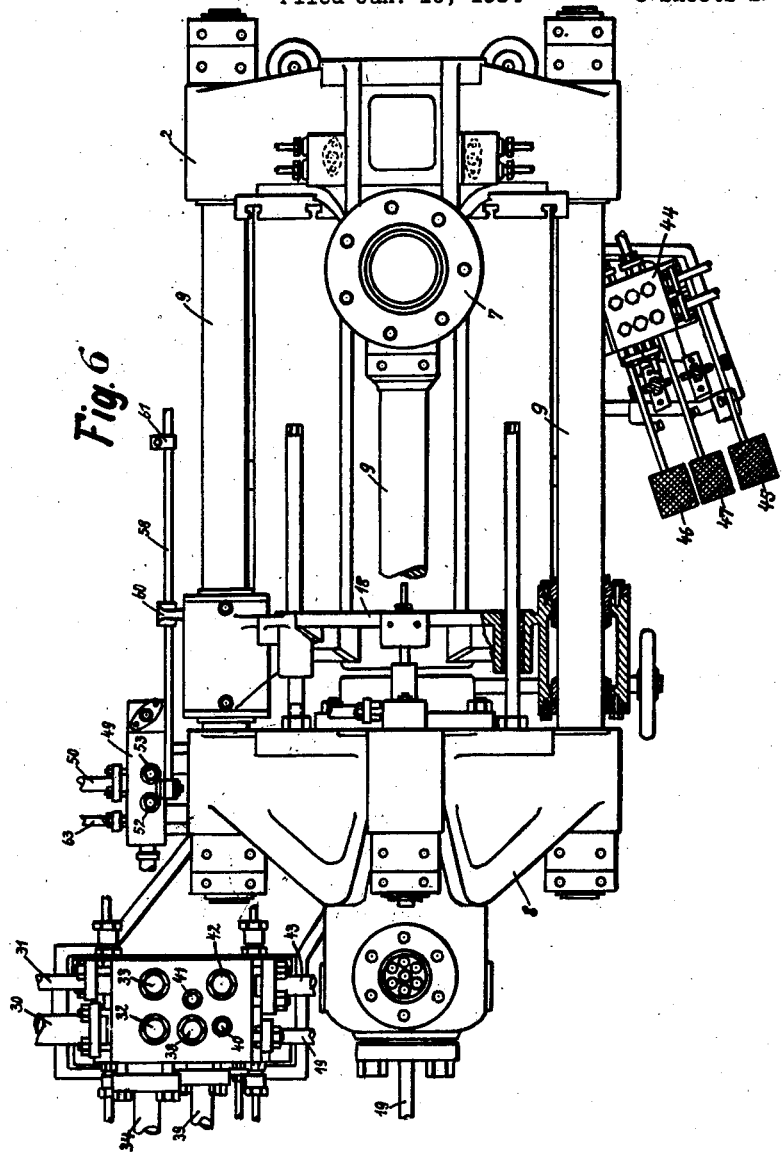
Fig. 6 shows in top plan view the die casting machine (without mold) in inoperative position.
Figure 7:
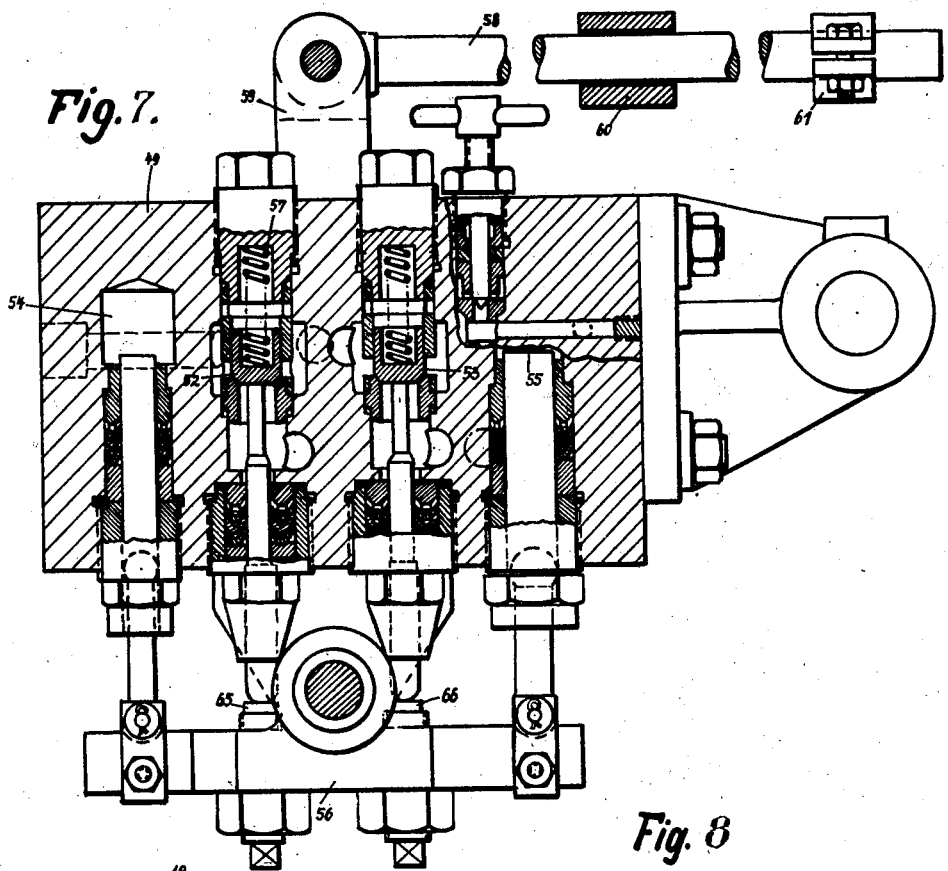
Fig. 7 is a section through the core drawing-control valve.

All controlled valves arranged in the control block 27 are actuated by hydraulic drives, which are controlled by means of pedals 45 and 46 of a control block 44 illustrated in Fig. 6. If both pedals are in raised or inoperative position, the two discharge valves 33 and 42 are open, whereas the valves 32, 38 and 40 are closed. When the pedal 45 is depressed, the admission valve 40 effecting the forward movement of the mold feed is opened and the discharge valve 42 closed. When the pedal 46 is depressed, the valve 38, controlling the supply to the pressure transmitter, is opened and the discharge valve 33 closed and subsequently the valve 32 controlling the forward movement of the pressure piston is opened. If it is desired to work with particularly slow pressure piston stroke, the valve 32 may be rendered inoperative so that it permanently remains closed in this instance, after the valve 38 has been opened by depressing the pedal 46, the pressure water flows through the narrow bore 64, in being strongly throttled, into the conduit 34 leading to the pressure piston driving cylinder.

Figure 4:
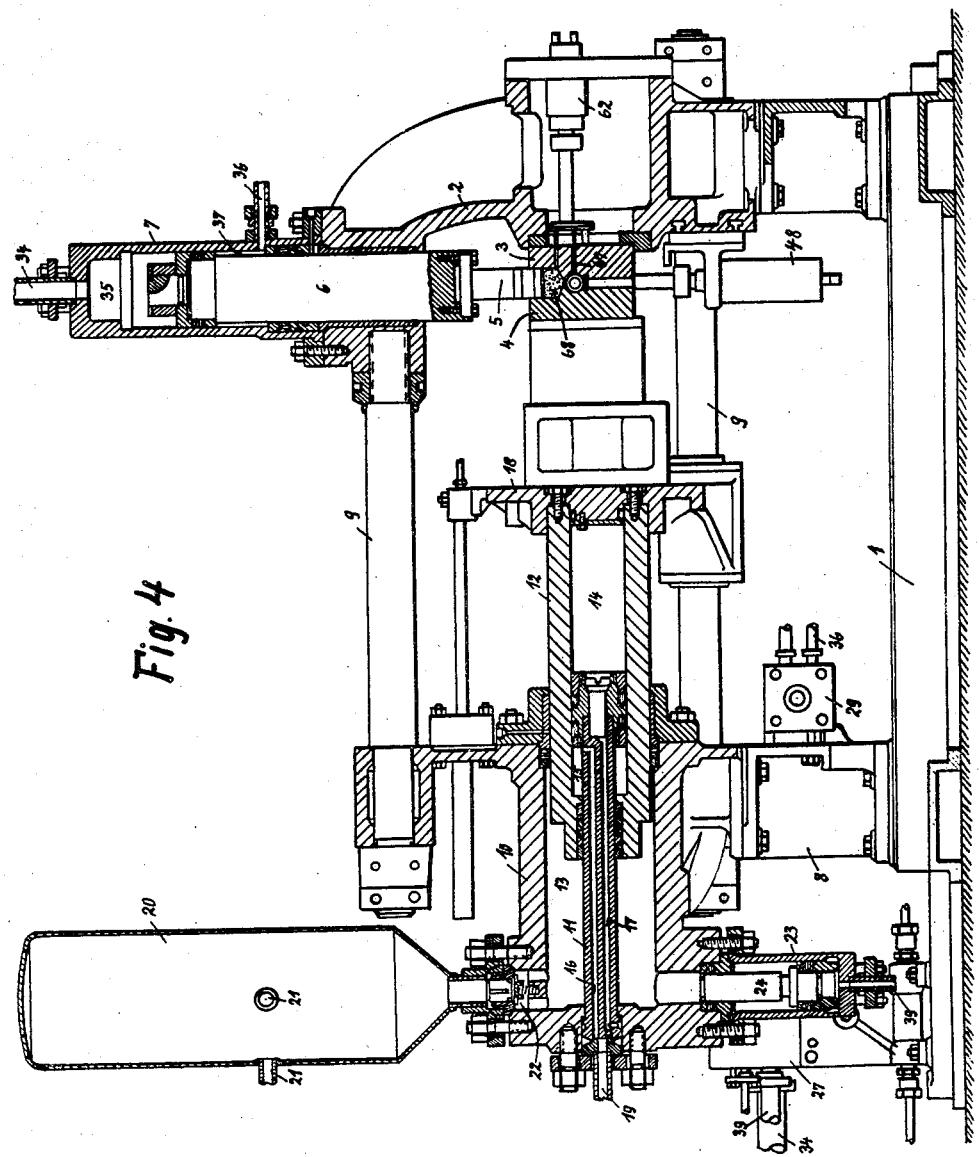
Fig. 4 shows a longitudinal section through the die casting device with closed mold at the commencement of the pressing operation.
Figure 5:
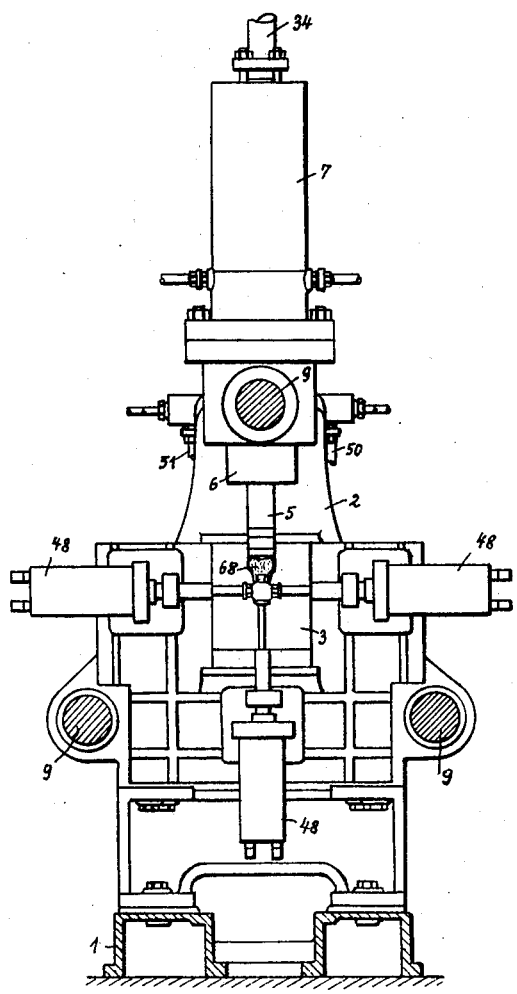
Fig. 5 shows in elevation the front upright with pressure piston driving cylinder and stationary mold half viewed on the parting line.

Three core-operating cylinders 48 (Figs. 4 and 5) are arranged on the upright 2 for actuating in different directions the cores situated in the stationary mold half, stepped pistons being arranged in these cylinders and connected with the movable cores. The entirely cylindrical inner spaces of the cylinders 48 controlling the core feed are connected by a conduit 50 with a valve block 49 (Figs. 6, 8 and 9) arranged laterally on the machine, whereas the annular spaces of the cylinders 48 controlling the backward movement of the cores are permanently connected with the pressure water supply conduit 30 by a non-controlled conduit 51.

The valve block 49 accommodates two valves 52 and 53 one of which connects the pressure supply conduit and the other the discharge conduit 63 with a conduit 50, and the two hydraulic driving cylinders 54 and 55, the cylinder 54, of smaller piston diameter, permanently communicating with the pressure water supply conduit through a non-controlled conduit and the other cylinder 55, of larger piston diameter, being adapted to be brought into communication with this pressure water supply conduit by a valve adapted to be actuated by the pedal 45. The pistons of the cylinders 54 and 55 act on a lever 56 which controls the valves 52 and 53. When the driving cylinder 55 is without pressure, the lever 56 is in its inoperative inclined position in which it maintains the discharge valve 53 in open position, whereas the admission valve 52 is held open by a spring 57 so that the feed side of the core removing cylinders is relieved and consequently the cores are withdrawn. If pressure is supplied to the cylinder 55, the lever 56 is rocked into its opposite inclined position, in which it opens the admission valve 52, whereas the discharge valve 53 is closed, so that the cores are pushed forward. The control of the pressure medium supply and discharge to the cylinder 55 is effected by the pedal lever 45, which also controls the forward movement of the movable mold half. In consideration of other mold elements, to be separately actuated, it is often desirable for the cores not to be pushed forward immediately at the commencement of the forward movement of the mold and not to be withdrawn immediately at the commencement of the opening of the mold, but that the forward movement of the cores is effected only after the mold has been moved forward a certain distance and the withdrawal of the cores only after the mold has opened a certain distance. This is effected by a rod system which consists of a lever 59 rigidly connected with the lever 56 and of a rod 58 which is guided in a sleeve 60 mounted on the plate 18 and provided with an abutment 61, which, when the mold is closed, bears against the sleeve 60 when the valve 52 is open. If, during the upward movement of the pedal lever 45 the mold is opened and at the same time the cylinder 53 of the valve block 49 relieved, the non-controlled cylinder 54 cannot immediately reverse the valve aggregate for actuating the cores, because this is prevented by the abutment 61 on the sleeve 60 of the mold carrier. Only as the mold opens can the lever 56 turn so that, after the mold has opened a certain distance, the withdrawing of the cores can begin. It is evident, that abutments 65 and 66 of the lever 56 must be so set, that during the reversal first the admission valve 52 is closed and only then the discharge valve 53 is opened at a correspondingly later time. By means of a second abutment suitably arranged on the rod 58 and bearing against the sleeve 60 when the mold is open, it is possible, by depressing the pedal 45, to cause the forward movement of the cores not immediately but only after the mold has moved forward a certain distance.

A hydraulic cylinder 62 is provided on the upright 2 for actuating an ejecting device 67 arranged on the stationary mold half, this cylinder being controlled by the pedal lever 47 of the control block.

The die casting device operates in the following manner:—In the position of rest, in which all the pedals 45, 46 47 are raised, the discharge valves 33 and 42 of the control block 27, the discharge valve 53 of the valve stock 49 and the discharge valve (not shown) of the front side of the ejector cylinder 62 are open, and all other valves are closed, so that the mold is held open by the uncontrolled pressure acting in the annular space 15, the pressure piston held in raised position by the uncontrolled pressure acting in the annular space 37, and the cores and the ejector device are held in withdrawn position by the constant pressure acting on the returning sides of the core actuating cylinders 48 and of the cylinder 62. For commencing the cycle of movements the pedal lever 45 is depressed so that first the discharge valve 42 is closed, the valve 40 controlling the mold closing movement is opened and the cylinders 55 of the core controlling block 49 are placed under pressure. The movable mold half starts moving, whereupon water flows from the pressureless tank 20 into the pressure-free cylinder space 13. After the movable mold half has moved a certain distance, the valve 52 of the core-controlling block 49 is opened, causing the advancement of the cores.

The pedal 45 is locked in lowered position by a snap hook. During the closing of the mold the valve 26 is opened by means of a rod system, and the whole inner space 13 of the cylinder 10 is thus placed under pressure. After the mold has closed, the pressure chamber 68 is charged with metal, whereupon the pedal 46 is depressed, causing the valve 38, controlling the admission of pressure to the pressure transmitter, to open, the discharge valve 33 to close and subsequently the valve 32 controlling the outward movements of the pressure piston to open, so that, owing to the action of the pressure transmitter, first the inner spaces 13 and 14 of the mold-closing aggregate are subjected to an increased pressure corresponding to the ratio of transmission of the pressure transmitter, and directly afterwards the pressure piston 5 is forced outwards. Immediately after the termination of the pressure stroke, the pedal 46 is raised, causing the admission valve 32 to close, the discharge valve 33 to open, and finally the pressure transmitter valve 38 to close, so that the pressure piston 5 returns into its initial position, and the pressure in the cylinder spaces 13 and 14 again drops to the accumulator pressure of the pressure water. By disengaging the snap hook locking the pedal 45, the upward movement of the pedal 45 is effected, whereby the mold-closing valve 40 is closed, the discharge valve 42 opened, and the cylinder 55 of the core controlling block relieved so that, by the constant pressure acting in the annular space 15 of the mold-closing aggregate the mold is opened and, after it has travelled a certain distance, the core removal effected by reversing the control block 49. The ejector device 64 can then be actuated by depressing the pedal 47 and drawn back by the ascending movement thereof, whereupon the cycle of operation can be repeated.

By the construction of the operating and control means according to the invention it is possible to ensure, in die casting machines in which the pressure chamber is arranged in the parting line of the mold, an absolutely reliable, tight closing of the mold, without employing pressure media of different pressures and especially without the necessity of providing fittings and conduits under particularly high pressure, and without the apparatus, especially the packing parts, being stressed by the very high closing pressure forces longer than is necessary for attaining the object in view. By arranging the pressure transmitter directly on the mold-closing cylinder, it is avoided to employ pipe conduits and unions and the like, which would be subjected to the high pressure necessary in the mold closing cylinder during the actual casting operation, so that, on the one hand, the securing of service of the plant is considerably increased and, on the other hand, the occurrence of resilient phenomena is avoided. The subdividing of the mold closing-cylinder into the inner space 14 and the annular space 13, only the former of which is filled with pressure water during the working stroke, whereas the latter is filled by gravity with water from the tank 20, ensures an exceedingly economical consumption of pressure water. Further, owing to the fact that the valves united in the control block 27 are hydraulically operated, and only the controls of these hydraulic valve drives are actuated by the pedals, the advantage is obtained, that the opening and closing of the valves controlling the die casting device as regards operating periods and during the opening movement, are effected independently of the skill of the operator, this being extremely important in view of the great importance attached to the timing of the controlling operations in machines of this type.

It is evident, that the inventive idea is not restricted to die casting machines of the form of construction illustrated in the drawings and above described, but can be applied to all types of die casting machines with pressure chamber arranged on the parting line of the mold in which the opening and closing and the maintaining in closed condition of the mold during the injection, with employment of only one hydraulic pressure medium, is controlled in such a manner that this pressure medium actuates the movement proceedings of the opening and closing of the mold by direct action on a mold closing-cylinder, whereas, for maintaining the mold in closed condition during the pressing operation, the pressure medium acts on the mold closing-cylinder through the intermediary of a pressure transmitter arranged close to the mold closing-cylinder, so that during this period the cylinder is subjected to an increased pressure corresponding to the ratio of transmission of the pressure transmitter.

I claim:—

1. A device for producing die castings, comprising in combination a two-part mold having a hollow space arranged in its parting line serving as a pressure chamber, a plunger piston adapted to enter said space to force the material to be pressed into said mold at an extremely high pressing pressure exceeding 100 atmospheres, a double acting hydraulic cylinder of relatively small internal cross-section adapted to open and close said mold, a cylinder of considerably larger internal diameter adapted to maintain said mold in closed condition, said larger cylinder being without pressure during the opening and closing movements of said mold, a pressureless gravity tank communicating with said larger cylinder, a pressure conduit, means for connecting said larger cylinder with said conduit or said smaller cylinder and for shutting off said larger cylinder from said tank during the closing of said mold.

2. A device for producing die castings, comprising in combination a two-part mold having a hollow space arranged in its parting line serving as a pressure chamber, a plunger piston adapted to enter said space to force the material to be pressed into said mold at an extremely high pressing pressure exceeding 100 atmospheres, an operative cylinder directly subjected to a hydraulic pressure medium to effect the opening and closing of the mold, a second cylinder adapted to maintain the mold in closed condition, a booster directly and rigidly connected with said second cylinder, and acting upon said second cylinder through the intermediary of the pressure medium.

3. A die casting machine for casting molten metals comprising a pressure chamber, a fixed die and a movable die having casting cavities on their contacting surfaces lying in a vertical direction and leading half-channels opening into the pressure chamber, said pressure chamber being divided by the contacting surfaces of the dies into two halves, each of which is provided in one of the dies and permitting the casting of molten metal of form maintaining consistency, a double acting hydraulic cylinder of relatively small internal cross section to open and close said die members, a cylinder of considerably larger internal diameter, said larger cylinder being without pressure during the opening and the closing movements of said mold, a pressureless gravity tank communicating with said larger cylinder by a pressure conduit, and means for connecting said larger cylinder with said conduit or said smaller cylinder and for shutting said larger cylinder from said tank during the closing of said mold.

4. A die casting machine for casting molten metals comprising a pressure chamber, a fixed die and a movable die having casting cavities on their contacting surfaces lying in a vertical direction and leading half-channels opening into the pressure chamber, said pressure chamber being divided by the contacting surfaces of the dies into two halves, each of which is provided in one of the dies and permitting the casting of molten metal of form maintaining consistency, an operative cylinder directly subjected to a hydraulic pressure medium to effect the opening and closing of said die-members, a second cylinder adapted to maintain the die members in closed condition, and a booster directly and rigidly connected with said second cylinder and acting upon said second cylinder through the intermediary of the pressure medium.

5. A die casting machine for casting molten metals comprising a pressure chamber, a fixed die and a movable die having casting cavities on their contacting surfaces lying in a vertical direction and leading half-channels opening into the pressure chamber, said pressure chamber being divided by the contacting surfaces of the dies into two halves, each of which is provided in one of the dies and permitting the casting of molten metal of form maintaining consistency, an operative cylinder directly subjected to a hydraulic pressure medium to effect the opening and closing of said die members, a second cylinder adapted to maintain the die members in closed condition, a booster directly and rigidly connected with said second cylinder and acting upon said second cylinder through the intermediary of the pressure medium, the element controlling the pressure water admission to the booster controls at the same time the pressure water admission to a cylinder actuates the forward movement of the pressing piston, and a narrow throttle point between this cylinder and the control valve to ensure retardation of the pressure action upon the pressing piston relative to the pressure action upon the booster.

JOSEF POLAK.